C. H. SAGE.
Dumping Car.
No. 94,445.
Patented Aug. 31, 1869
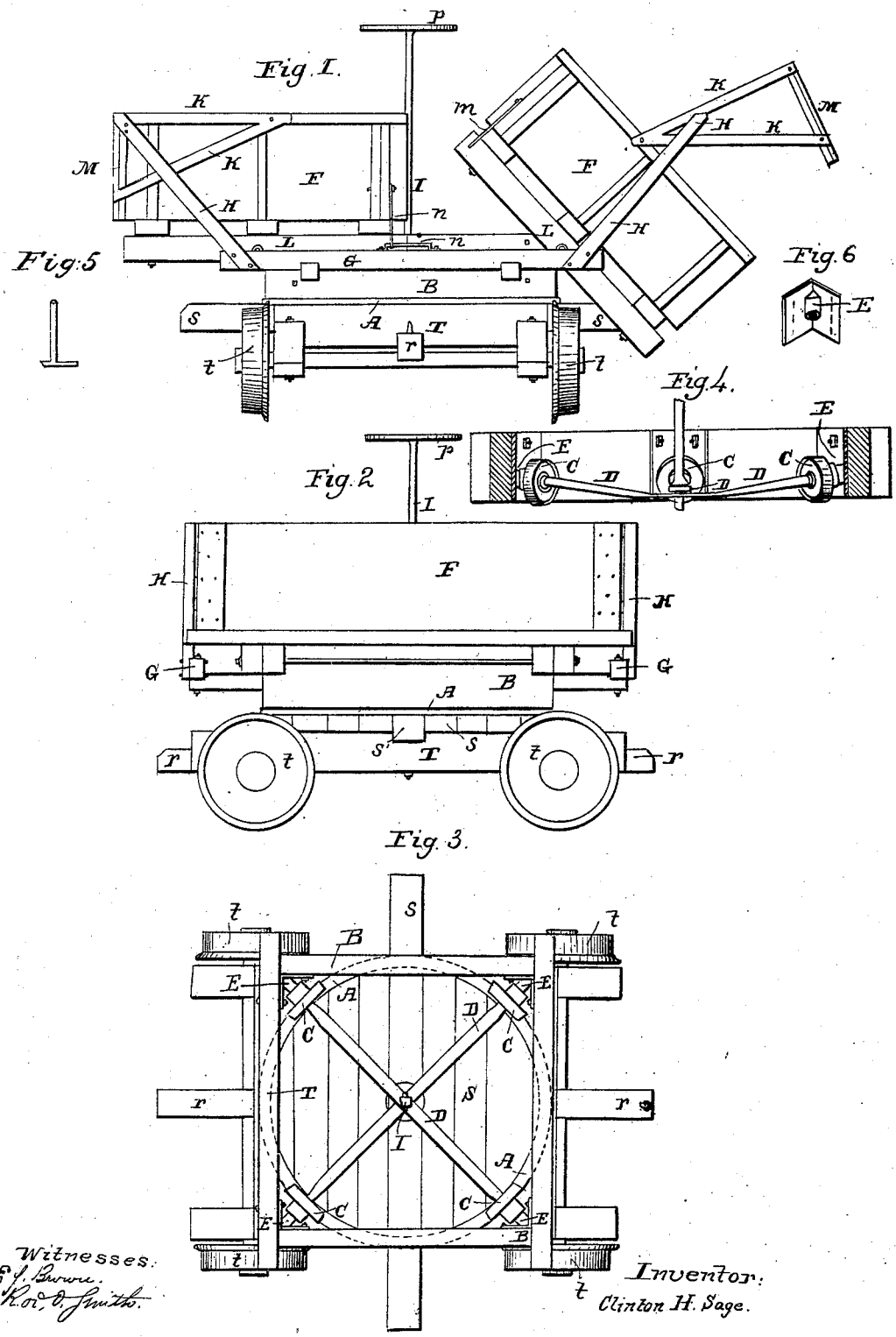

United States Patent Office.

CLINTON H. SAGE, OF FULTON, NEW YORK.

Letters Patent No. 94,445, dated August 31, 1869.

IMPROVED DUMPING-CAR.

The Schedule referred to in these Letters Patent and making part of the same.

*To all whom it may concern:*

Be it known that I, CLINTON H. SAGE, of Fulton, in the county of Oswego, and State of New York, have invented an Improved Revolving Dumping-Car; and I do hereby declare that the following is a full and exact description thereof, reference being had to the accompanying drawings, making part of this specification—

Figure 1 being a front elevation of the car;
Figure 2, a side elevation thereof;
Figure 3, a plan of the truck, the car-bodies and frame being removed;
Figures 4, 5, and 6, views of parts detached.

Like letters designate corresponding parts in all of the figures.

In the construction of this car an ordinary truck or platform-car, T, may be used, of the required gauge.

The platform S thereof is made of sufficient size to receive, between the wheels $t\ t$, an annular or circular track, A, which is secured centrally thereon, as represented.

Thus the body of the car, which is to revolve upon this track, can be brought low enough to easily fill with shovels.

I allow a beam or timber, $r$, to project from the truck-frame at each end, for the car-bodies or boxes to strike and rest on in dumping, and limit the extent to which they tip.

These timbers may serve to couple and draw the cars by.

Similar beams or timbers, $s\ s$, project at the sides, for dumping at the sides of the track.

Upon the track A, a frame, B, rests, being provided with four friction-wheels, C C C C, situated within the four angles thereof, and turning on diagonal axles D D, over the annular track, substantially as shown in fig. 3.

The ends of the axles D D rest in boxes E E, shown separately in fig. 6, which are secured by flanches and bolts in the corners of the frame.

These strong "angle-irons" or boxes sustain the whole weight of the load.

The friction-wheels C C have conical faces, they being parts of cones whose apexes coincide with the centre of the annular track on which the wheels travel; and in order that the whole face or tread of these wheels may rest and roll upon the track, the journals of the axles D D, on which the wheels turn, are inclined, as shown in fig. 4, just sufficient to bring the lower line, or line of contact between the wheels and track, on a level.

Thus the wheels run with as much freedom and with as little friction as cylindrical wheels on a straight track.

The axles D D cross each other over the centre of the track A, and are provided with holes, through which a vertical shaft or king-bolt, I, passes, and through the platform of the truck below, thereby keeping the car-frame B centred in its position, since it turns around this shaft as a pivot.

The frame B projects over the track A, and covers it so that no gravel or other obstruction will fall on the track, to impede the free turning of the car-body thereon.

Upon the frame B two car-bodies or boxes, F F, rest, meeting in the centre, as shown in fig. 1.

They are pivoted to the outer ends of the frame, and, under their own centres, on axes or journals L L, so as to be tilted and dumped, as seen at the right hand in fig. 1.

The relative dimensions of the boxes and frame are such that the boxes will be nearly or exactly balanced thereon, so as to tilt easily with their loads, and the whole frame balanced by the two boxes.

Thus the whole frame B can be turned to any position with the car-bodies or boxes, and dump the loads either at the ends or sides of the truck, or both bodies successively at one end or one side.

When the two boxes are loaded, whatever their position on the truck, they are balanced.

The doors or tail-boards M M of the car-boxes are self-opening, as the boxes are tilted and dumped, by means of a device substantially as follows:

At the sides of the frame B projecting timbers G G are secured, for the purpose of supporting fixed oblique standards H H, substantially as represented in fig. 1.

These standards are so arranged as to support, in grooves, or notches, or brackets, at their upper ends, or otherwise, the upper sides of angle or brace-irons K K, to which the doors or tail-boards are affixed.

The inner ends of the angle-irons are pivoted, at $k$ $k$, to the car-bodies or boxes.

The whole arrangement is such that as the boxes are tilted, the doors or tail-boards are held suspended or raised away from the open ends of the boxes, leaving the same free to discharge their contents, all as clearly indicated in the same figure.

The doors are entirely automatic in action, and require no attention.

The car-bodies or boxes are held upright by catches $m\ m$, figs. 1 and 5, working under loops $n\ n$, or their equivalent.

The brakes of the car-wheels are operated at the centre of the car.

The central pivot-shaft I is situated in this position, and serves the purpose of winding the brake-chains on, a brake-wheel, $p$, being secured to its upper end.

Thus the brakes are applied with equal efficacy and ease, whatever the position of the car on the truck;

nor does it interfere with the motions of the car-bodies or boxes in any position.

What I claim as my invention, and desire to secure by Letters Patent, is—

1. The combined construction and arrangement of the revolving balanced frame B, covering and shielding the curved track A, on the car-truck, and the two counterbalancing car-boxes F F, substantially as herein specified.

2. Also, the inclined journals on the axles D D, arranged, in relation to the conical friction-wheels C C and level track A, substantially as and for the purpose specified.

3. Also, the fixed supporting-standards H H, arranged in combination with the car-boxes F F and brace-irons K K, on which the tail-boards M M are mounted, so as to raise said tail-boards as the car-boxes are tilted, and *vice versa*, substantially as set forth.

4. Also, the employment of the pivot-shaft I, around which the car-frame B turns, for the additional purpose of a brake-rod or shaft, as specified.

CLINTON H. SAGE.

Witnesses:
HENRY L. HINCKLEY,
LEWIS YOUMANS.